United States Patent [19]

Hobson

[11] 4,024,972

[45] May 24, 1977

[54] LIFT TRUCK APPARATUS

[76] Inventor: Lloyd L. Hobson, 312 N. East St., Elnora, Ind. 47529

[22] Filed: Feb. 23, 1976

[21] Appl. No.: 660,337

[52] U.S. Cl. .......................... 214/650 R; 187/9 E; 187/95; 214/620; 214/731

[51] Int. Cl.² .......................................... B65G 47/00

[58] Field of Search .......... 214/730, 731, 620, 621, 214/701, 95 R; 187/9 E, 95, 17, 19, 26

[56] References Cited

UNITED STATES PATENTS

| | | | |
|---|---|---|---|
| 2,507,583 | 5/1950 | Wellman | 214/701 Q |
| 2,618,360 | 11/1952 | MacDonald | 214/653 |
| 3,191,788 | 6/1965 | Hopfeld | 214/701 R |
| 3,414,086 | 12/1968 | Ulinski | 187/9 E |
| 3,727,781 | 4/1975 | Ramsey | 187/9 E |
| 3,782,503 | 1/1974 | Sinclair | 187/9 E |

*Primary Examiner*—Lawrence J. Oresky
*Attorney, Agent, or Firm*—Jenkins, Hanley & Coffey

[57] ABSTRACT

For use with a lift truck, a lifting apparatus which combines compact height when not fully extended with extended height exceeding that of a conventional mast and frame assembly. The apparatus includes a selectively engageable transmission which drives a load-engaging and lifting member vertically with respect to the frame apparatus. The transmission is engaged to convert relative motion between the mast and frame into motion of the engaging member with respect to the frame. A significant increase is achieved in the maximum elevated height of the assembly, while maintaining the compact unelevated height of the conventional mast and frame assembly. In one embodiment of the invention, the transmission drives load-engaging members laterally to accommodate wider loads.

2 Claims, 7 Drawing Figures

3

LIFT TRUCK APPARATUS

The present invention relates to lift truck attachments and more specifically to an improved lifting attachment for lift trucks.

The present invention deals with an improved lifting arrangement for lift trucks, the lifting apparatus of which comprises a mast member attached firmly to the body of the truck and a frame member movable with respect to the mast member for lifting and lowering such objects as crates and cartons. Lift trucks of the type to which this invention relates are discussed in, for example, U.S. Pat. No. 3,023,919, issued Mar. 6, 1962, to the present inventor, and titled "Lift Truck Attachment," and U.S. Pat. No. 3,200,978, issued Aug. 17, 1965, to J. L. Brady, et al., and titled "Crate and Carton Handling Attachment For Industrial Trucks". Such patents are considered to be representative of the prior art in the area with which the present invention deals.

It is often advantageous to have a mast and frame type lifting apparatus such as those described in the aforementioned U.S. patents which is not limited in the height to which it can lift by the combined height of the mast and frame. Conventionally, such systems, of course, cannot lift an article to a height greater than the sum of the mast height and frame height. However, it is also frequently desirable to have a mast and frame mechanism which is not so tall that it will not fit through an opening of limited height, such as, for example, a loading door of a truck or railroad car. These two competing considerations, sufficient lifting apparatus height to enable the lift truck operator conveniently to stack articles one upon another, and compact lifting apparatus height to enable the operator to maneuver the lift truck through a door of low height, make suitable lifting apparatus difficult to obtain.

It is thus an object of the present invention to provide improved lifting apparatus which combines compact height when not fully extended with extended height which greatly exceeds that of the conventional mast and frame apparatus.

Another object of the present invention is to provide such an improved apparatus for use with a lift truck having a mast and a frame, at least a portion of which frame is vertically movable with respect to the mast for lifting an article to be transported by the truck, which improved apparatus includes means attached to the frame for movement relative thereto and for engaging the article to be lifted, and means for transmitting relative motion between the mast and frame to the engaging means, thereby causing the engaging means to move relative to the frame and multiplying the rate at which the article may be engaged and lifted.

An additional object of the present invention is to provide an improved apparatus for use with such a lift truck in which the motion transmitting means moves the load engaging means horizontally, rather than vertically, with respect to the frame. It will be appreciated that the motion transmitting means may be arranged on the truck to move the load-engaging means horizontally and/or vertically at the selection of the operator.

A further object of the present invention is to provide such an improved apparatus wherein the transmission means comprises a pair of sprockets on the frame, a roller or hoist chain engaging the sprockets, causing them to rotate together, a linkage attached to the mast and selectively actuable for engaging a portion of the length of the chain, thereby immobilizing the chain with respect to the mast and causing the sprockets to rotate, and a gear train coupled to one of the sprockets and actuated by such rotation of the sprocket, the load-engaging means comprising a rack engaging a gear of the gear train for movement in response to actuation of the gear train.

Another object of the present invention is to provide such an improved apparatus wherein the gear train includes a horizontally extended worm, and the load-engaging means includes laterally movable means for engaging said worm.

Additional objects of the present invention will be apparent to those of ordinary skill in the art to which this invention relates. The invention may best be understood by referring to the following description and accompanying drawings of which:

Figure 1:
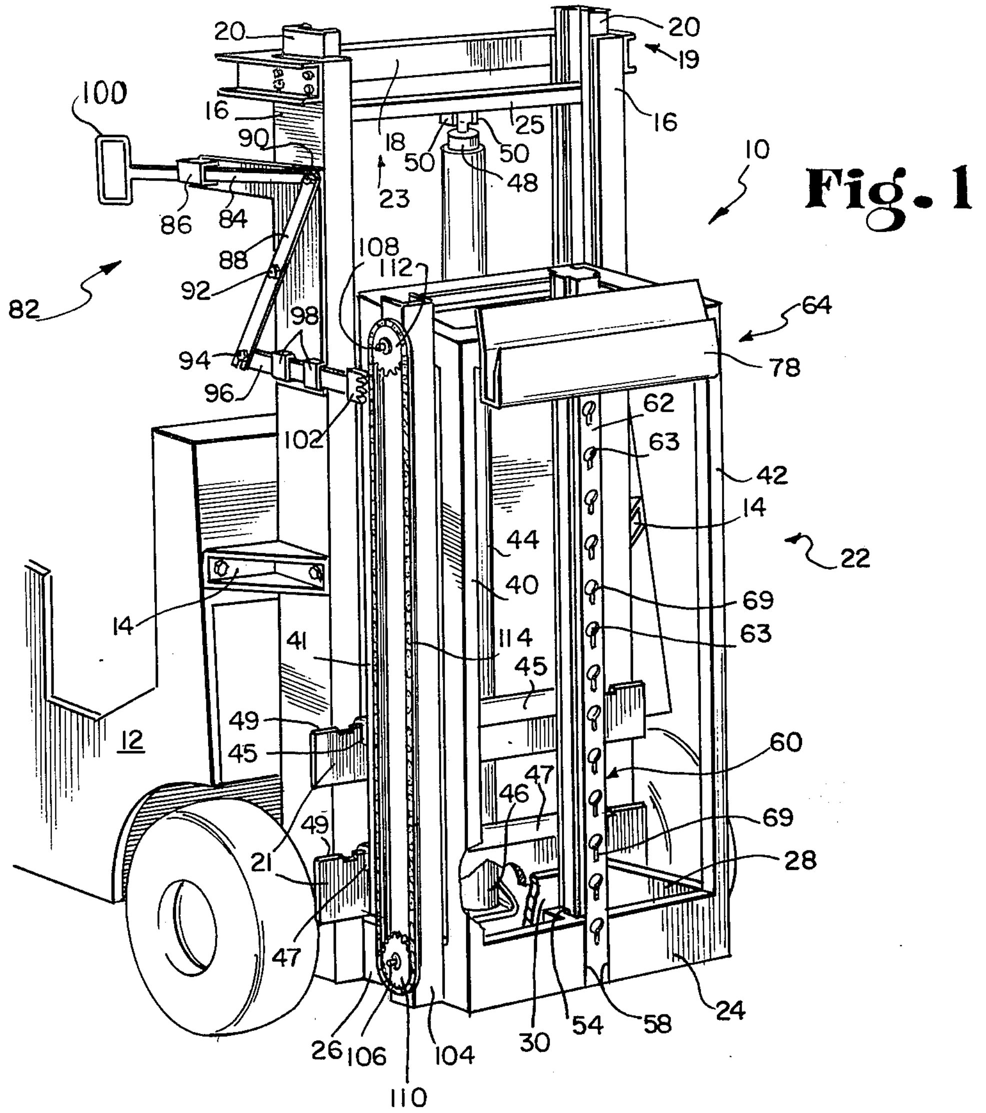
FIG. 1 is a fragmentary perspective view of a lift truck including the improved attachment of the present invention mounted on the lift mechanism thereof.
Figure 2:
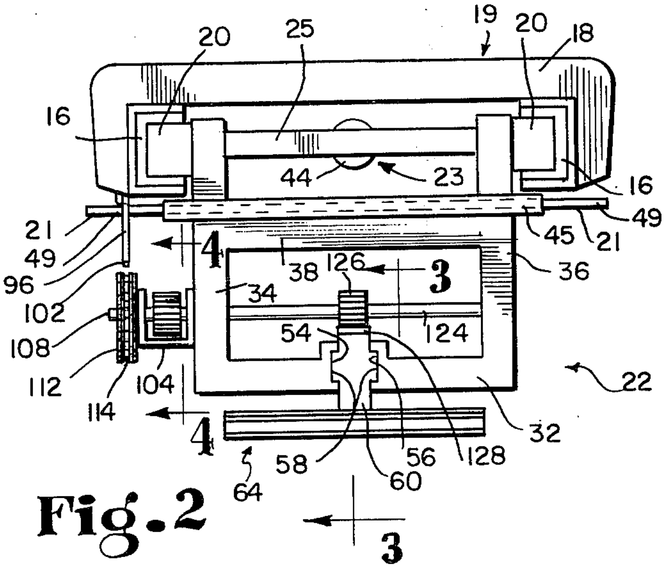
FIG. 2 is a top view of a portion of the lift mechanism of the lift truck illustrated in FIG. 1.
Figure 3:
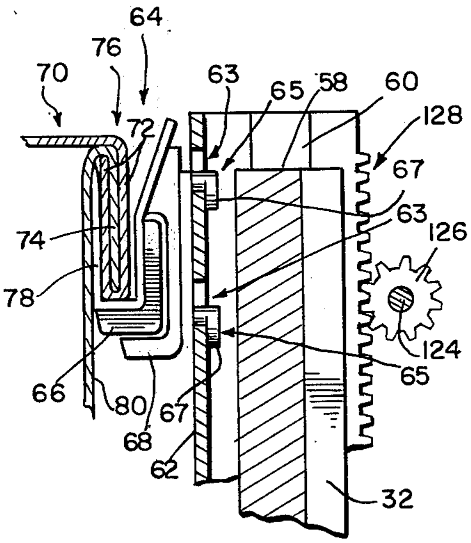
FIG. 3 is a partial sectional view taken generally along section lines 3—3 of FIG. 2.
Figure 4:
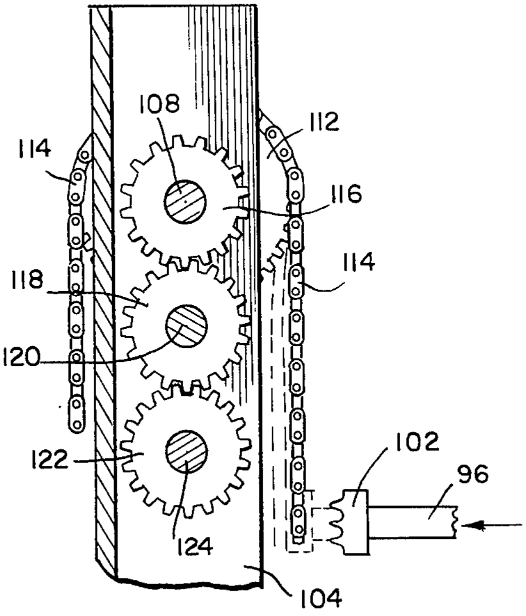
FIG. 4 is a partial sectional view of the apparatus of FIGS. 2–3, taken along sections lines 4—4 of FIG. 2.

In the embodiment of the invention illustrated in FIGS. 1–4, a lift apparatus 10 is attached to a lift truck 12 by mounting brackets 14. The lift apparatus 10 comprises a pair of vertically extending channels 16, each of which has a generally C-shaped cross section. Channels 16 are held in spaced apart relation by one or more generally horizontally extending brackets 18. Channels 16 and bracket 18 form the mast 19 subassembly of the lifting apparatus 10.

Channels 16 slidingly receive a pair of vertically extending members 20. Members 20 carry between them a pair of narrow, vertically extending plates 21 which comprise a conventional hook-type lift truck carriage. Vertical members 20 are also joined near their upper ends by a bar 25. Elements 20, 21, 25 comprise the frame assembly 23 of the lifting apparatus.

A box-shaped mounting structure 22 comprises four horizontal bottom members 24, 26, 28, 30 and four horizontal top members 32, 34, 36, 38. There top and bottom assemblies are joined at their four corners by vertically extending members 40, 41, 42, 43. Near the lower ends of each of members 41, 43 are a pair of mounting brackets 45, 47 which hook over the horizontally extending upper edges 49 of plates 21 to attach mounting structure 22 to frame 23.

A hydraulic cylinder 44 is attached at its lower end 46 to truck 12. The upper end 48 of the piston of cylinder 44 is attached to a pair of mounting brackets 50 which project from the underside of bar 25. Actuation of hydraulic cylinder 44 causes vertical movement of the frame 23 with respect to the mast 19.

Extending vertically approximately halfway between members 40, 42 are a pair of channels 54, 56. Channels 54, 56 have generally C-shaped horizontal cross sections. Channels 54, 56 form, along their facing sides, a slideway 58 which slidingly receives a vertically extending member 60. A lifting plate 64 is attached to member 60 near the top of its forward face 62 by brackets 66, 68. Brackets 66, 68 are attached to member 60 by the keyhole aperture and stud arrangement described in detail in my aforementioned U.S. Pat. No. 3,023,919. A plurality of vertically spaced apart keyhole apertures 63 are provided in the forward face 62 of member 60. A pair of studs 65 having enlarged head ends 67 (shown in FIG. 3) are attached to the rearward side of bracket 68. Heads 67 of the studs protrude through apertures 63 and blade 64 is then lowered, engaging the heads behind the narrow bottom portions 69 of two of apertures 63. Blade 64 is thereby attached to member 60. Of course, other means may be used to attach the blade 64 to member 60. The reciprocably mounted locking bolt described in detail in my aforementioned U.S. patent may also be used with the keyhole aperture and stud arrangement above described, although the locking bolt is not illustrated in the arrangement described.

The structure of lifting plate 64 is as described in my aforementioned U.S. Pat. No. 3,023,919. Such structure is desirable for lifting a type of carton known as a folded-cap carton, which type of carton is also described in my aforementioned United States patent. For purposes of illustration, however, FIG. 3 contains a partial sectional view of such a carton 70 being engaged by lifting plate 64. An upper cap 72 of carton 70 is folded over upon the upper lip 74 of the carton. The folded cap 76 thus formed may be reinforced by fastening a steel band (not shown) about the perimeter of the cap.

To engage and to lift such a carton 70, the forward blade 78 of the lift plate 64 is urged against the side 80 of the carton. Then plate 64 is urged upwardly into engagement with folded cap 76, thereby lifting the carton. Apparatus 60, 64 thus comprises means for engaging the article to be lifted. Of course, other types of lifting attachments besides plate 64 may be used with the apparatus of the present invention.

In order to raise the lifting plate 64 into engagement with the article to be lifted, prior art lift truck apparatus raised the frame by energizing the hydraulic cylinder 44 until the article to be lifted was engaged. In the present invention, in order to multiply the rate at which lifting plate 64 may be raised to engage the article to be lifted, and to increase the maximum lifting height of the lifting apparatus, the plate 64 is mounted for movement on the structure 22 and drivingly connected to a motion transmitting means to be discussed hereinafter.

The illustrative motion transmitting means includes a Z-linkage 82 having an upper bar 84 which is horizontally and slidably received in a bracket 86 attached to the outside of the mast vertical member 16. A diagonal middle bar 88 is pivotally attached at its upper end 90 to bar 84, pivotally attached at its mid portion 92 to mast member 16 and pivotally attached at its lower end 94 to a horizontally extending lower bar 96. Bar 96 is slidably received in brackets 98 attached to the outside of mast member 16. The end of bar 84 remote from pivot 90 terminates in a handle 100. The end of bar 96 remote from pivot 94 terminates in a toothed brake 102.

A transmission housing 104 extends vertically alongside mounting structure 22. Housing 104 has a generally C-shaped horizontal cross section and is attached, as by welding, to frame members 26, 34. Supported for rotation upon shafts 106, 108 at the lower and upper ends, respectively, of housing 104 are a pair of sprockets 110, 112. A roller chain 114 is trained about sprockets 110, 112. The teeth of brake 102 are proportioned to engage the links of roller chain 114. The shafts 106, 108 extend into the transmission housing 104 and are supported for rotation thereby. A driving gear 116 is attached to shaft 108 for rotation therewith.

An idler gear 118 on a shaft 120 is housed within housing 104 beneath, and in engaging relationship with driving gear 116. A driven gear 122, also housed within housing 104, engages idler gear 118 and turns upon a shaft 124 which is supported for rotation in mounting structure 22. A pinion gear 126 is attached to shaft 124 approximately halfway across structure 22. Pinion gear 126 engages a rack 128 which extends vertically substantially the full length of member 60 along its rearward side.

In operation, as handle 100 is urged rearwardly by a lift truck operator, this motion is transmitted through the Z-linkage to brake 102 which engages roller chain 114. As hydraulic cylinder 44 is energized, and the frame 23 moves upwardly with respect to the mast 19, the length of chain 114 engaged by brake 102 remains stationary. Sprockets 110, 112 thus rotate causing shaft 108 to rotate. Rotation of shaft 108 is transmitted through gears 116, 118, 122 and shaft 124 to pinion 126. Rotation of pinion 126, of course, causes member 60 to be projected upwardly at a rate which is a multiple of the rate of upward projection of the frame 23 with respect to the mast 19. This multiple, of course, may be any value desired, depending upon the selection of the gear ratios and tooth ratios of the various gears and sprockets in the transmission.

Of course, when the lift plate 64 reaches the proper height to engage the article to be lifted, the brake 102 may be disengaged and a suitable locking device, such as the keyhole locking apparatus described in my aforementioned U.S. Pat. No. 3,023,919, may be engaged to fix the vertical position of the plate 64 relative to the frame 23. The frame 23 may then be raised further relative to the mast 19 without affecting the relative positioning of the lift plate 64 and frame 23.

Figure 7:
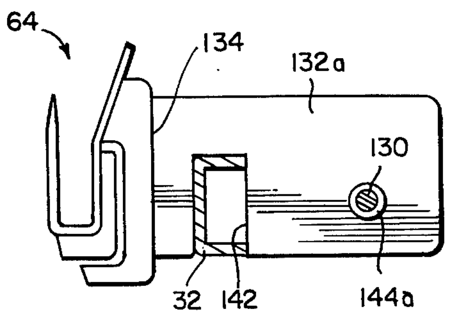
FIG. 7 is a partial sectional view of the embodiment of FIGS. 5—6, taken along section lines 7—7 of FIG. 5.
Figure 5:
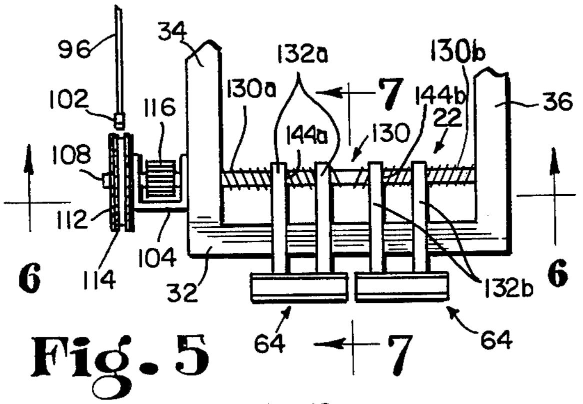
FIG. 5 is a partial top plan view of an alternative embodiment of the present invention.
Figure 6:
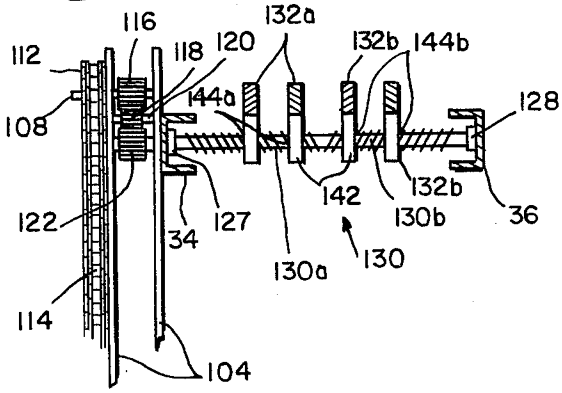
FIG. 6 is a partial sectional view of the embodiment illustrated in FIG. 5, taken generally along section line 6—6 thereof.

Since it is frequently desirable to adjust container engaging members outwardly horizontally from the center of the lift frame 23, the illustrative embodiment of FIGS. 5–7 is presented to accomplish this objective. In this embodiment, most of the transmission mechanism remains as it was in the embodiment of FIGS. 1–4. Housing 104 supports sprockets 110, 112 which are both engaged by chain 114. Gears 116, 118, 122 are disposed within housing 104. In this embodiment, however, driven gear 122 drives a worm 130 which is supported between horizontal members 34, 36 at the top of mounting structure 22. Worm 130 is journalled in bearings 127, 128 at its ends and is threaded along approximately half its length **130*a* in a first direction, and for approximately the remaining half of its length 130*b* in the opposite direction. A pair of lift plates 64 are coupled to the transmission mechanism by brackets 132*a* which engage worm portion 130*a* and by brackets 132*b* which engage worm portion 130*b*. Brackets 132*a* are provided with means 144*a* near their rearward ends for engaging worm portion 130*a*. Brackets 132*b* are provided with means 144*b* near their rearward ends for engaging worm portion 130*b*. Each of brackets 132*a*, 132*b* is provided with a downwardly opening rectangular notch 142 which slidably engages member 32**.

As brake 102 is actuated to engage chain 114, the transmission drives, through worm 130, the two lift plates 64 in opposite directions, the directions determined by the threading of worm portions 130*a*, 130*b* and engaging means 144*a*, 144*b* and also by whether the frame is being raised or lowered relative to the mast. Thus, the transmission apparatus of FIGS. 5–7 allows lift plates to be positioned horizontally at a predetermined distance from one another as desired by the lift truck operator. This capability allows the lift truck operator to transport loads of varying widths without having to change the widths of the lift plates 64 which are on the lifting assembly.

It may be appreciated that the transmission mechanism of the instant invention may be used to power a combined height- and width-adjusting engaging mechanism. For example, a pinion gear similar to gear 126 of FIGS. 1–4 may be placed at the midpoint of worm 130 of FIGS. 5–7. This pinion gear may then be used to drive a rack of a height adjustment apparatus similar to the height adjustment apparatus 60, 64 illustrated in FIGS. 1–4.

There is thus described a transmission mechanism which derives power from the relative motion of conventional lift truck mast and frame assemblies to adjust, either vertically or horizontally, the mechanism which engages an article to be lifted.

The apparatus thus provided for handling articles of varying heights and widths. The improved apparatus also is capable of multiplication of the rate at which the frame moves relative to the mast, the multiplication being in either the vertical or the horizontal direction. The disclosed apparatus further provides an extension of the vertical height to which an article may be lifted by the lift assembly, while maintaining the compact height of the conventional mast and frame assembly.

For purposes of illustration of the invention, various elements of the assemblies of the FIGS. have been expanded and simplified. It is to be understood that various changes in the form and relative arrangement of parts may be made to suit individual requirements without departing from the scope of the appended claims.

What is claimed is:

1. Apparatus for use with a lift truck having a mast and a frame vertically movable with respect to said mast for lifting an article to be transported by said truck, said apparatus comprising means for engaging said article to be lifted, said engaging means being vertically movable with respect to said frame, in which the improvement comprises means for mounting said engaging means upon said frame for movement relative thereto, and means for transmitting said relative motion of said mast and frame to said engaging means for causing said engaging means to move relative to said frame, said transmitting means comprising a pair of sprockets on said mounting means, a chain engaging said sprockets for causing them to rotate together, selectively actuable means for engaging a portion of the length of said chain for immobilizing said length of chain with respect to said mast for causing said sprockets to rotate when said frame is moved relative to said mast, and a gear train coupled to at least one of said sprockets, and said engaging means comprising a rack engaging a gear of said train for moving said engaging means vertically at a multiple of the rate of vertical movement of said frame with respect to said mast.

2. Apparatus for use with a lift truck having a mast and a frame vertically movable with respect to said mast for lifting an article to be transported by said truck, said apparatus comprising means for engaging said article to be lifted, said engaging means being horizontally movable with respect to said frame, in which the improvement comprises means for mounting said engaging means upon said frame for movement relative thereto, and means for transmitting said relative motion of said mast and frame to said engaging means for causing said engaging means to move relative to said frame, said transmitting means comprising a pair of sprockets on said mounting means, a chain engaging said sprockets and causing them to rotate together, selectively actuable means for engaging a portion of the length of said chain for immobilizing said length of chain with respect to said mast for causing said sprockets to rotate when said frame is moved relative to said mast, a gear train coupled to at least one of said sprockets, and a horizontally extending worm driven by said gear train, and means for drivingly connecting said engaging means to said worm for horizontal movement when said worm is driven.

* * * * *

UNITED STATES PATENT OFFICE

CERTIFICATE OF CORRECTION

Patent No. 4,024,972 Dated May 24, 1977

Inventor(s) Lloyd L. Hobson

It is certified that error appears in the above-identified patent and that said Letters Patent are hereby corrected as shown below:

Column 2, line 52, "There" should be -- These --;
Column 5, line 28, "provided" should be -- provides --;
Column 6, line 19 (Claim 1, line 21) after "said" and before "train" insert -- gear --.

Signed and Sealed this

*Eleventh* Day of *October 1977*

[SEAL]

*Attest:*

RUTH C. MASON
*Attesting Officer*

LUTRELLE F. PARKER
*Acting Commissioner of Patents and Trademarks*